US012541407B2

(12) United States Patent
Rui

(10) Patent No.: US 12,541,407 B2
(45) Date of Patent: Feb. 3, 2026

(54) METHOD AND APPARATUS FOR DEPLOYING DEEP LEARNING SYSTEM

(71) Applicant: INSPUR SUZHOU INTELLIGENT TECHNOLOGY CO., LTD., Jiangsu (CN)

(72) Inventor: Faling Rui, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 426 days.

(21) Appl. No.: 18/269,261

(22) PCT Filed: Sep. 29, 2021

(86) PCT No.: PCT/CN2021/121910
§ 371 (c)(1),
(2) Date: Jun. 22, 2023

(87) PCT Pub. No.: WO2022/257303
PCT Pub. Date: Dec. 15, 2022

(65) Prior Publication Data
US 2024/0045733 A1 Feb. 8, 2024

(30) Foreign Application Priority Data

Jun. 11, 2021 (CN) .......................... 202110651910.6

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45562* (2013.01); *G06F 2009/45595* (2013.01)

(58) Field of Classification Search
CPC ............... G06F 9/5077; G06F 9/45558; G06F 2009/45562; G06F 2009/45595;
(Continued)

(56) References Cited

U.S. PATENT DOCUMENTS

| 2017/0093964 A1 | 3/2017 | Barzik et al. |
| 2021/0011762 A1 | 1/2021 | Lin et al. |
| 2022/0014584 A1* | 1/2022 | Huetter ................. G06F 9/4843 |

FOREIGN PATENT DOCUMENTS

| CN | 110941440 A | 3/2020 |
| CN | 111105549 A | 5/2020 |

(Continued)

OTHER PUBLICATIONS

Waldemar Hummer, ModelOps: Cloud-based Lifecycle Management for Reliable and Trusted AI, Jun. 24, 2019 (Year: 2019).*
(Continued)

*Primary Examiner* — Dong U Kim
(74) *Attorney, Agent, or Firm* — IPro, PLLC

(57) ABSTRACT

A method for deploying a deep learning system, including: defining a node group template for a first node group and a second node group, the node group template including indications of components installed by the first node group and components installed by the second node group; defining a cluster template for a device group based on the node group template, the cluster template including indications of the number of first nodes and the number of second nodes; validating whether the cluster template is rationally configured, and creating, based on the cluster template, virtual machines, that correspond to first nodes and second nodes and each has an artificial intelligence framework, in response to the cluster template being rationally configured; and configuring a communication benchmark for virtual machines, and importing a deep learning mirror image into
(Continued)

the artificial intelligence frameworks of the virtual machines respectively.

20 Claims, 2 Drawing Sheets

(58) Field of Classification Search
CPC .......... G06F 8/63; G06F 9/44505; G06F 8/60; H04L 41/08; H04L 41/0893; H04L 67/10
See application file for complete search history.

(56) References Cited

FOREIGN PATENT DOCUMENTS

| | | |
|---|---|---|
| CN | 111782232 A | 10/2020 |
| CN | 113254158 A | 8/2021 |

OTHER PUBLICATIONS

Ye Yuan. "The Design and Implementation of Big Data PaaS Service Based on OpenStack." A dissertation for a master's degree. Southwest Jiaotong University. Apr. 2019.

* cited by examiner

METHOD AND APPARATUS FOR DEPLOYING DEEP LEARNING SYSTEM

CROSS-REFERENCE TO RELATED APPLICATION

The present disclosure claims priority to Chinese patent application No. 202110651910.6, titled "METHOD AND APPARATUS FOR DEPLOYING DEEP LEARNING SYSTEM" and filed on Jun. 11, 2021 with the CNIPA, China National Intellectual Property Administration, which is incorporated herein in its entirety by reference.

TECHNICAL FIELD

The present disclosure relates to the artificial intelligence field, in particular to a method and apparatus for deploying a deep learning system.

BACKGROUND

Artificial intelligence (AI) is a new technical science for learning and developing theories, methods, techniques, and application systems for simulating, extending, and expanding human intelligence. AIStation in the related art provides all training services including data upload, model development, model training, and training visualization for a deep learning computing cluster. AIStation supports various deep learning systems, is capable of deploying a deep learning training environment quickly, and managing deep learning training tasks comprehensively, and providing an efficient and easy-to-use platform for deep learning users; AIStation manages, schedules, and monitor the CPU (central processing unit) and GPU (graphics processing unit) resources of computing cluster uniformly to effectively improve the utilization rate and productivity of computing resources.

However, it is cumbersome and hard to deploy AIStation cluster in the related art. Firstly, it is necessary to prepare the cluster and install an operating system for all nodes; secondly, an installation package is uploaded at a management node, and configuration files are modified, and then an installation script is executed step-by-step. The installation of the operating systems is very time-consuming. Especially, when there are many nodes in the cluster, not only the installation of the operating systems is labor-intensive, but also modification of the configuration files and execution of the installation script may fail due to careless.

As for the problem in the related art that it is hard to deploy the AIStation cluster, no effective solution has been found yet.

SUMMARY

In view of the above, it is an object of embodiments of the present disclosure to provide a method and an apparatus for deploying a deep learning system.

In view of the above object, a first aspect of embodiments of the present disclosure provides a method for deploying a deep learning system, including:
  defining a node group template for a first node group and a second node group, and the node group template includes indications of components installed by the first node group and components installed by the second node group;
  defining a cluster template for a device group based on the node group template, and the cluster template includes indications of a number of first nodes in the device group for which the components are installed as per the first node group and a number of second nodes in the device group for which the components are installed as per the second node group;
  validating whether the cluster template is rationally configured, and creating, based on the cluster template, a plurality of virtual machines, that correspond to a plurality of first nodes and a plurality of second nodes and have an artificial intelligence framework respectively, in response to the cluster template being rationally configured; and
  configuring a communication benchmark to the plurality of virtual machines, and importing, based on the communication benchmark, a deep learning mirror image into the artificial intelligence framework of each of the virtual machines.

In some embodiments, the method further includes creating an artificial intelligence plug-in including a common module before defining the node group template for the first node group and the second node group, and the common module is used for defining all components called by a deep learning system; the defining the node group template for the first node group and the second node group includes: acquiring all the components from the common module, and defining the node group template for the first node group and the second node group within a range defined by all the components.

In some embodiments, the method further includes: creating an artificial intelligence plug-in including a validation module before defining the node group template for the first node group and the second node group; a plurality of components to be installed by the first node group and the second node group respectively include control components and high-availability components; the validating whether the cluster template is rationally configured includes: using the validation module to check whether the number of the control components to be installed respectively by the plurality of first nodes and the plurality of the second nodes in the cluster template is an odd number, and/or whether the high-availability components to be installed are all provided with a downtime state detection function.

In some embodiments, the creating, based on the cluster template, a plurality of virtual machines, that correspond to a plurality of first nodes and a plurality of second nodes and each has an artificial intelligence framework, in response to the cluster template being rationally configured includes:
  determining that the cluster template is rationally configured in response to the number of the control components to be installed respectively for the plurality of first nodes and the plurality of second nodes in the cluster template being an odd number, and/or the high-availability components to be installed being all provided with the downtime state detection function; and
  in response to the cluster template being rationally configured, creating, based on the cluster template, the plurality of virtual machines by the validation module using an arrangement technique, and deploying mirror images of an artificial intelligence installation package to the plurality of virtual machines respectively.

In some embodiments, the method further includes creating an artificial intelligence plug-in including a deploy module before defining the node group template for the first node group and the second node group; the configuring a communication benchmark to the plurality of virtual machines includes: deploying a same clock and password-less communication to the virtual machines by the deploy module.

In some embodiments, the deploy module is stored with a network time protocol installation script and a network file system installation script; the configuring a communication benchmark to the plurality of virtual machines includes: selectively executing, by the deploy module and based on the cluster template, the network time protocol installation script and the network file system installation script on the plurality of virtual machines.

In some embodiments, a graphics processing unit driver installation script is further stored in the deploy module; the configuring the communication benchmark for the plurality of virtual machines further includes: executing the graphics processing unit driver installation script for a virtual machine additionally in response to detecting that the first node or the second node, to which the virtual machine corresponds, is provided with a graphics processing unit directly connected to the first node or the second node.

In some embodiments, the configuring the communication benchmark for the plurality of virtual machines further includes: installing additional high-availability components to a virtual machine in response to detecting that a number of components to be installed by the first node or the second node, to which the virtual machine corresponds, is greater than a threshold.

In some embodiments, the method further includes: creating an artificial intelligence plug-in including a client module before defining the node group template for the first node group and the second node group; and after configuring the communication benchmark for the plurality of the virtual machines, checking, by the client module, whether the communication benchmark is successfully configured.

A second aspect of embodiments of the present disclosure provides an apparatus for deploying a deep learning system, including:
- a processor;
- a controller storing a program code executable by the processor, wherein the program code, when executed by the processor, causes the processor to execute steps of:
  - defining a node group template for a first node group and a second node group, and the node group template includes indications of components installed by the first node group and components installed by the second node group;
  - defining a cluster template for a device group based on the node group template, and the cluster template includes indications of a number of first nodes in the device group for which the components are installed as per the first node group and a number of second nodes in the device group for which the components are installed as per the second node group;
  - validating whether the cluster template is rationally configured, and creating, based on the cluster template, a plurality of virtual machines, that correspond to a plurality of first nodes and a plurality of second nodes and have an artificial intelligence framework respectively, in response to the cluster template being rationally configured; and
  - configuring a communication benchmark to the plurality of virtual machines, and importing, based on the communication benchmark, a deep learning mirror image into the artificial intelligence framework of each of the virtual machines.

BRIEF DESCRIPTION OF THE DRAWINGS

In order to more clearly illustrate technical solutions of embodiments of the present disclosure or the related art, the figures that are required to describe the embodiments or the related art will be briefly introduced below. Apparently, the figures that are described below illustrates merely some embodiments of the present disclosure, and those skilled in the art may obtain other figures according to these figures without paying creative effort.

DETAILED DESCRIPTION

In order to make the objects, solutions, and advantages of the present disclosure clearer, embodiments of the present disclosure will be further described in detail below in conjunction with specific embodiments and with reference to the accompanying drawings.

It should be noted that expressions "first" and "second" as used throughout the embodiments of the present disclosure are used for distinguishing two distinct entities or parameters with the same name. It can be seen that "first" and "second" are merely for the convenience of expressions and should not be understood as limiting the embodiments of the present disclosure, and in the subsequent embodiments, this will not be explained repeatedly.

Figure 1:
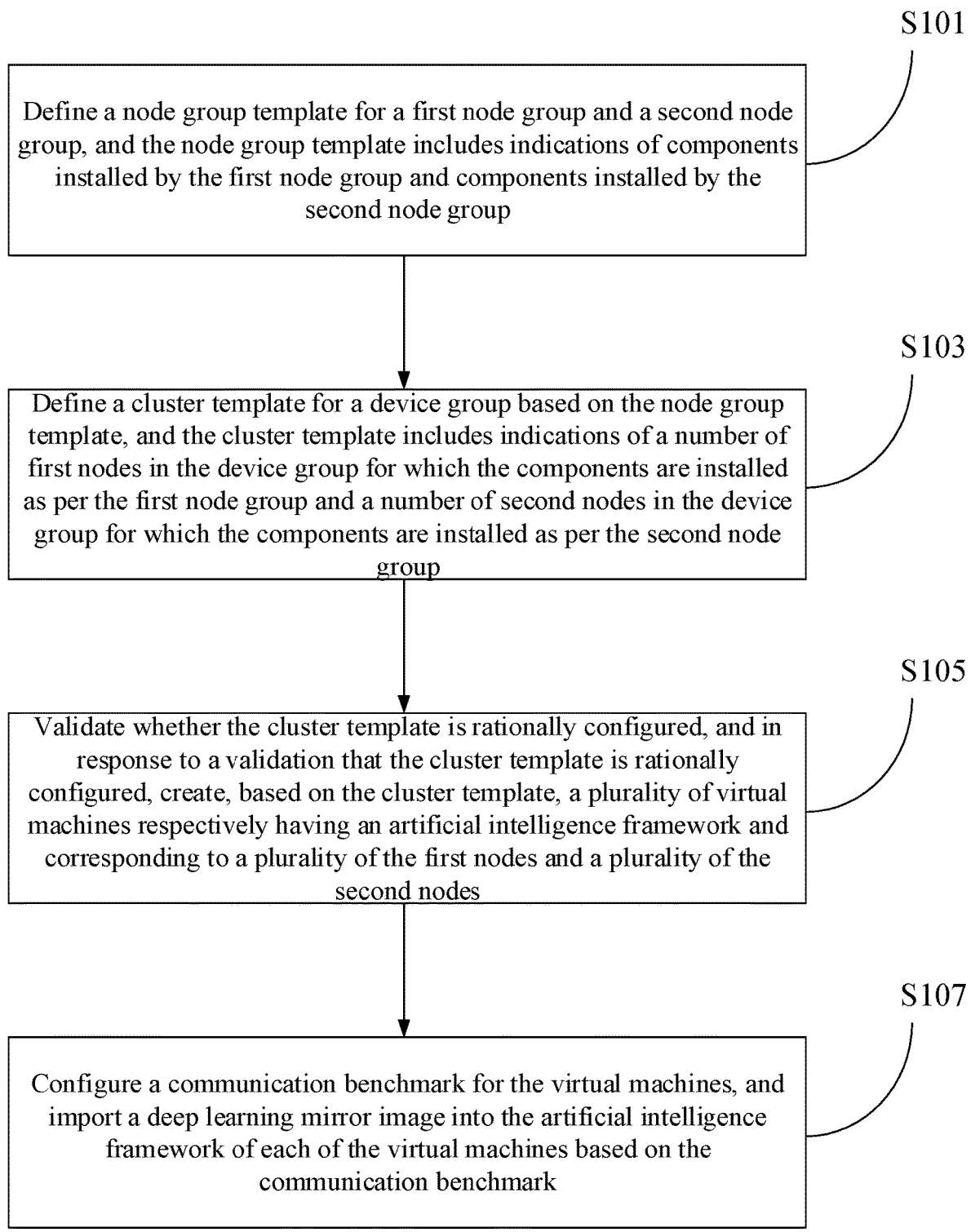
FIG. 1 is a schematic flowchart of a method for deploying a deep learning system according to the present disclosure.

In view of the above object, in a first aspect of the embodiments of the present disclosure, an embodiment of a method for deploying a deep learning system, that is capable of automatically performing deployment of an AIStation cluster and improving the availability and accessibility of the AIStation cluster, is set forth. FIG. 1 is a schematic flowchart of the method of deploying a deep learning system as provided herein.

As shown in FIG. 1, the method for deploying a deep learning system includes steps described below.

At step S101, a node group template for a first node group and a second node group is defined, and the node group template includes indications of components installed by the first node group and components installed by the second node group.

At step S103, a cluster template for a device group is defined based on the node group template, and the cluster template includes indications a number of first nodes, for which the components are installed as per the first node group, in the device group, and a number of second nodes, for which the components are installed as per the second node group, in the device group.

At step S105, it is validated whether the cluster template is rationally configured, and in response to the cluster template being rationally configured, a plurality of virtual machines, that correspond to the plurality of first nodes and the plurality of second nodes and each has an artificial intelligence framework, are created based on the cluster template.

At step S107, a communication benchmark is configured for each of the virtual machines, and a deep learning mirror image is imported into the artificial intelligence framework of each of the plurality of the virtual machines based on the communication benchmark.

It will be appreciated by those skilled in the art that all or part of the flow of the method in the embodiment described above may be accomplished by instructing associated hardware via a computer program stored on a computer-readable storage medium, that, when being executed, includes the flow of the embodiment of the method described above. The storage medium may be a magnetic disk, an optical disk, a read-only storage ROM, or a random storage RAM, etc. Embodiments of the computer program may achieve the same or similar effects as any of the preceding method embodiments corresponding thereto.

In some embodiments, the method further includes: creating an artificial intelligence plug-in including a common module before the node group template for the first node group and the second node group is defined, the common module being used for defining all components called by a deep learning system. The node group template for the first node group and the second node group is defined by: acquiring all the components from the common module, and defining the node group template for the first node group and the second node group within a range defined by all the components.

In some embodiments, the method further includes: creating an artificial intelligence plug-in including a validation module before the node group template for the first node group and the second node group is defined. The components to be installed by the first node group and the second node group respectively include control components and high-availability components. Whether the cluster template is rationally configured is validated by: using the validation module to check whether the number of the control components to be installed respectively by the first nodes and the second nodes in the cluster template is an odd number, and/or whether the high-availability components to be installed are all configured with a downtime state detection function.

In some embodiments, in response to the cluster template being rationally configured, the plurality of virtual machines that correspond to the first nodes and the second nodes and each has an artificial intelligence framework are created based on the cluster template as follows:
  in response to determining that the number of the control components to be installed respectively by the first nodes and the second nodes in the cluster template is an odd number, and/or the high-availability components to be installed are all configured with the downtime state detection function, determining that the cluster template is rationally configured; and
  in response to determining that the cluster template is rationally configured, creating, based on the cluster template, the plurality of the virtual machines by the validation module using an arrangement technique, and deploying mirror images of an artificial intelligence installation package to the plurality of the virtual machines respectively.

In some embodiments, the method further includes: creating an artificial intelligence plug-in including a deploy module before the node group template for the first node group and the second node group is defined. The communication benchmark for the plurality of the virtual machines is configured as follows: deploying, by the deploy module, a same clock and a passwordless communication for the plurality of the virtual machines respectively.

In some embodiments, a network time protocol installation script and a network file system installation script are stored in the deploy module. The communication benchmark is further configured for the plurality of the virtual machines by: selectively executing, by the deploy module, the network time protocol installation script and the network file system installation script on the plurality of the virtual machines based on the cluster template.

In some embodiments, a graphics processing unit driver installation script is also stored in the deploy module. The communication benchmark is further configured for the plurality of the virtual machines by: executing the graphics processing unit driver installation script for a virtual machine additionally in response to detecting that the first node or the second node to which the virtual machine corresponds is provided with a graphics processing unit directly connected thereto.

In some embodiments, the communication benchmark is further configured for the plurality of the virtual machines by: installing additional high-availability components to a virtual machine in response to detecting that a number of components to be installed for the first node or the second node, to which the virtual machine corresponds, is greater than a threshold.

In some embodiments, the method further includes: creating an artificial intelligence plug-in including a client module before the node group template for the first node group and the second node group is defined; and checking, by the client module, whether the communication benchmark is successfully configured after the communication benchmark is configured for the plurality of the virtual machines.

The apparatus, device, and the like disclosed in the embodiments of the present disclosure may be various electronic terminals, such as a mobile phone, a personal digital assistant (PDA), a PAD, and a smart television, or large-scale terminals, such as a server; thus, the scope of protection disclosed in the embodiments of the present disclosure shall not be limited to a certain type of apparatus and device. The client disclosed in the embodiments of the present disclosure may be applied in any of the above-mentioned electronic terminals in the form of electronic hardware, computer software, or a combination of both.

The implementation of the present disclosure is further illustrated below with reference to the embodiment shown in FIG. 2.

The present disclosure proposes a method for achieving, based on OpenStack, a one-click deployment of an AIStation cluster through a simple configuration. The whole deployment process includes installing the operating system and executing the deployment script. Therefore, firstly, a mirror image meeting the requirements of the AIStation cluster operation system is prepared, and the AIStation installation package is built in a specified location (e.g., /home/deploy_script/); the cluster architecture is abstracted as a cluster template, and according to the difference of components to be installed for various nodes, the nodes with the same components to be installed are abstracted as a node group template, so as to create virtual machines of different specifications through arrangement, and modify configuration files on this basis. In addition, a plug-in AIStation is added in Sahara for executing the deployment script of AIStation, and the deployment script installs different components on different nodes according to different installation components defined by the configuration files and node templates.

The computer-readable storage medium (e.g., memory) described herein may be either a volatile memory or a nonvolatile memory, or may include both the volatile and nonvolatile memory. By way of illustration and not limitation, the nonvolatile memory may include read-only memory (ROM), programmable ROM (PROM), electrically programmable ROM (EPROM), electrically erasable programmable ROM (EEPROM), or flash memory. The volatile memory may include random-access memory (RAM), which may act as external cache memory. By way of example and not limitation, RAM may be available in many forms such as synchronous RAM (DRAM), dynamic RAM (DRAM), synchronous DRAM (SDRAM), dual data rate SDRAM (DDR SDRAM), enhanced SDRAM (ESDRAM), synchronous link DRAM (SLDRAM), and direct Rambus RAM (DRRAM). The storage devices in the disclosed aspects are intended to include, but not be limited to, these and other suitable types of memory.

The various illustrative logical blocks, modules, circuits, and algorithm steps described in connection with the disclosure herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as software or hardware depends upon the particular application and design constraints imposed on the overall system. Those skilled in the art may implement the described functionality in varying ways for each particular application, but such implementation choices shall not be interpreted as causing a departure from the scope of the disclosed embodiments.

In addition, the method disclosed according to embodiments of the present disclosure may also be implemented as a computer program executed by a CPU, and the computer program may be stored in a computer-readable storage medium. The computer program, when executed by the CPU, performs the functions defined above in the method disclosed in the embodiments of the present disclosure. The method steps and system elements described above may also be implemented using a controller and a computer-readable storage medium for storing a computer program for causing the controller to perform the functions of the steps or elements described above.

Figure 2:
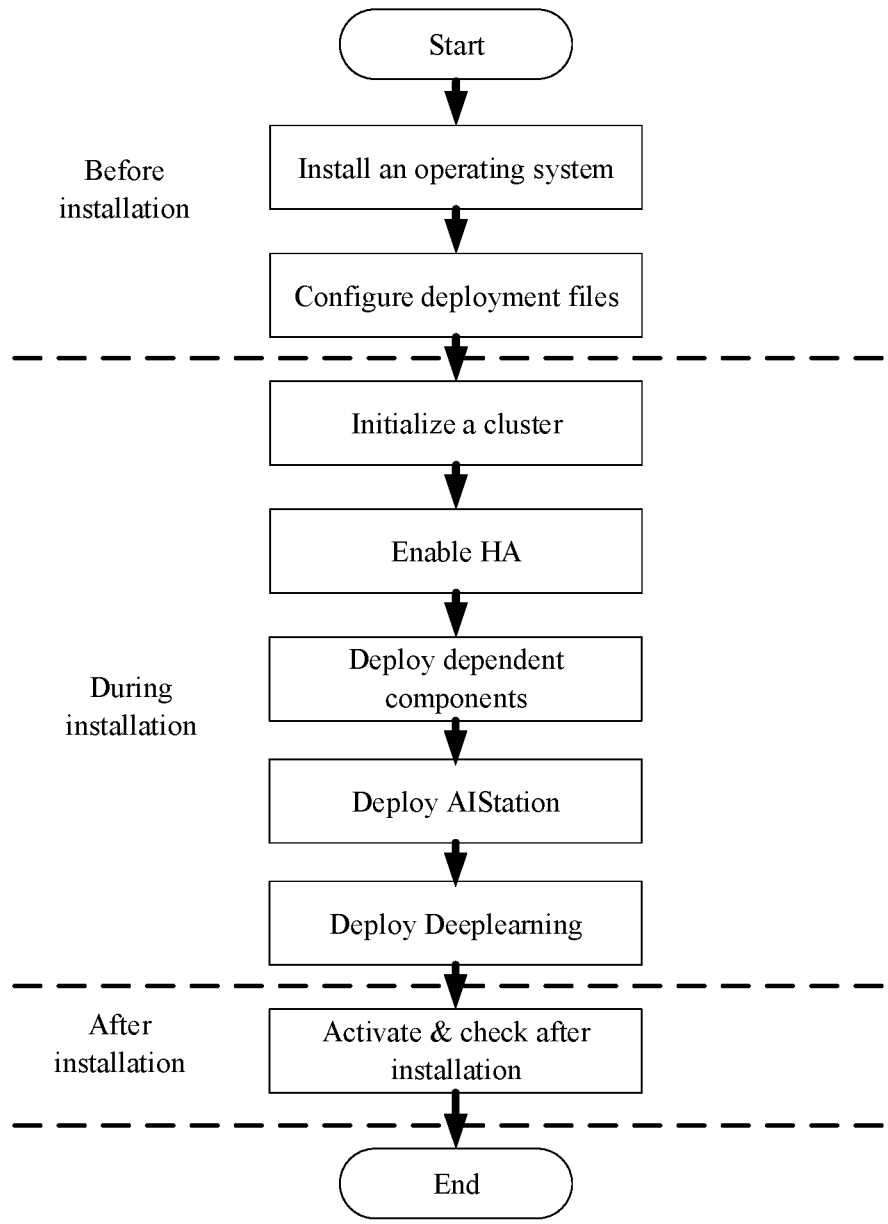
FIG. 2 is a concrete flowchart of the method for deploying a deep learning system according to the present disclosure.

In some embodiments, on the basis of the steps before installation shown in FIG. 2, an AIStation mirror image is first prepared for installing the operating system when creating a cluster, with built-in component installation program required by AIStation.

Next, the step of configuring deployment files in FIG. 2 is executed; the AIStation node group templates, i.e., master and worker (here, the master and worker respectively correspond to the first node group and the second node group mentioned above), are defined, and components to be installed by the node group are specified; a cluster template is defined according to the node group templates, and the number of various types of nodes is indicated in the cluster template. For example, if a master node is defined to be installed with components A, B and C, and a worker node is defined to be installed with components D and E, while a cluster template named tempi includes 3 master nodes and 4 worker nodes, then a cluster is created based on the cluster template tempi, and the cluster includes 7 nodes, that is, 3 master nodes and 4 worker nodes, and the 3 master nodes will be installed with components A, B, and C, and the 4 worker nodes will be installed with components D and E. In this way, the type and number of components to be installed by the first node and the second node in the first node group and the second node group are determined, which corresponds to the aforementioned steps S101 and S103.

Moreover, AIStation plug-ins are added to Sahara, and the plug-ins are divided into a common module, a client module, a validation module, a deploy module and the like. The common module defines all the components included in the AIStation cluster, so that the components can be selected when specifying the node group module, that is, the components in the node group template shall only be the components defined in the common module. The validation module is used for performing some validation operations, for example, validation operation as to whether the components of the cluster are rationally configured. The deploy module is used for executing a deployment script on deployment nodes of a remote cluster, and the deployment script is predefined in the deploy module of an AIStation plug-in, for example an NTP installation script and an NFS installation script. Further, the client module is additionally provided, in which some operations on the cluster are defined, for example, checking whether a certain operation step is successfully executed during the operation step. The various plug-in modules described above will be invoked at different subsequent moments.

When creating a cluster, with reference to the steps during installation shown in FIG. 2, the validation module validates whether a combination of components configured in the cluster template is rational, for example, whether the number of control components is an odd number, and whether a high-availability template is provided with Keepalived, and "Enable HA" in FIG. 2 refers to the template of high-availability components; when performing "deployment dependent components" and "AIStation deployment", the validation module creates, according to the cluster template, a virtual machine of a required specification by using an arrangement technique, and validates whether the virtual machine is based on the AIStation mirror image, that is, whether the AIStation installation package is included.

Next, the deploy module sets a same clock and a passwordless communication for the virtual machines in the cluster, and also executes the network time protocol installation script and the network file system installation script on the virtual machines, so that the virtual machines have a uniform communication benchmark; according to the cluster template, the deploy module of the AIStation plug-in performs the pre-defined deployment script in combination, and the client module checks whether the script is successfully executed; if so, the deployment process continues, and if not, a reason is prompted, and the deployment is terminated, corresponding to the above step S105. Additionally, a determination as to whether to install a GPU driver script is made according to whether a node is connected directly to the GPU, and a determination as to whether the high-availability components need to be installed is made according to the number of control components.

Finally, the installation of the cluster completes, and a basic deep learning mirror image is imported, with reference to the steps after installation shown in FIG. 2, post-installation activation and checking are performed to complete the installation and deployment of the cluster, corresponding to the above step S107.

The steps of the method or algorithm described in connection with the disclosure herein may be embodied directly in hardware, in a software module executed by a processor, or in a combination of both. A software module may reside in RAM, flash memory, ROM, EPROM, EEPROM, a register, a hard disk, a removable disk, a CD-ROM, or any other form of storage medium known in the art. An exemplary storage medium is coupled to a processor such that the processor may read information from, and write information to, the storage medium. Alternatively, the storage medium may be integrated with the processor. The processor and the storage medium may reside in an ASIC. The ASIC may reside in a user terminal. Alternatively, the processor and the storage medium may be discrete components resided in a user terminal.

As can be seen from the above embodiments, according to the method for deploying a deep learning system provided by embodiments of the present disclosure, an AIStation cluster can be automatically deployed and the availability and accessibility of the AIStation cluster are improved by a technical solution of: defining a node group template for a first node group and a second node group, the node group template including indications of components installed by the first node group and components installed by the second node group; defining a cluster template for a device group based on the node group template, the cluster template including indications of a number of first nodes in the device group for which the components are installed as per the first node group and a number of second nodes in the device group for which the components are installed as per the second node group; validating whether the cluster template is rationally configured, and in response to the cluster template being rationally configured, creating, based on the cluster template, a plurality of virtual machines that correspond to a plurality of first nodes and a plurality of second nodes and each has an artificial intelligence framework; and configuring a communication benchmark for the virtual machines, and importing a deep learning mirror image into the artificial intelligence framework of each of the virtual machines based on the communication benchmark.

It should be particularly pointed out that the steps in the various embodiments of the method for deploying a deep learning system described above may be intervened with or replaced by each other, added to one another, or deleted therefrom, and thus the method for deploying a deep learning system, with such changes and combinations, shall also fall within the scope of protection of the present disclosure, and the scope of protection of the present disclosure shall not be limited to embodiments described above.

In view of the above object, in a second aspect of the embodiments of the present disclosure, an embodiment of an apparatus for deploying a deep learning system that is capable of automatically performing deployment of an AIStation cluster and improving the availability and accessibility of the AIStation cluster is set forth. The apparatus includes:

a processor; and a controller storing processor-executable program codes that, when executed by the processor, cause the processor to execute steps of:

defining a node group template for a first node group and a second node group, the node group template including indications of components installed by the first node group and components installed by the second node group;

defining a cluster template for a device group based on the node group template, the cluster template including indications of a number of first nodes in the device group for which the components are installed as per the first node group and a number of second nodes in the device group for which the components are installed as per the second node group;

validating whether the cluster template is rationally configured, and in response to the cluster template being rationally configured, creating a plurality of virtual machines based on the cluster template, where the virtual machines correspond to a plurality of first nodes and a plurality of second nodes, and each of the virtual machines has an artificial intelligence framework; and configuring a communication benchmark for the virtual machines, and importing a deep learning mirror image into the artificial intelligence framework of each of the virtual machines based on the communication benchmark.

As can be seen from the above embodiments, according to the apparatus for deploying a deep learning system provided by embodiments of the present disclosure, an AIStation cluster can be automatically deployed and the availability and accessibility of the AIStation cluster are improved by a technical solution of: defining a node group template for a first node group and a second node group, the node group template including indications of components installed by the first node group and components installed by the second node group; defining a cluster template for a device group based on the node group template, the cluster template including indications of a number of first nodes in the device group for which the components are installed as per the first node group and a number of second nodes in the device group for which the components are installed as per the second node group; validating whether the cluster template is rationally configured, and in response to the cluster template being rationally configured, creating a plurality of virtual machines based on the cluster template, the virtual machines corresponding to a plurality of first nodes and a plurality of second nodes, and each of the virtual machines has an artificial intelligence framework; and configuring a communication benchmark for the virtual machines, and importing a deep learning mirror image into the artificial intelligence framework of each of the virtual machines based on the communication benchmark.

Figure 3:
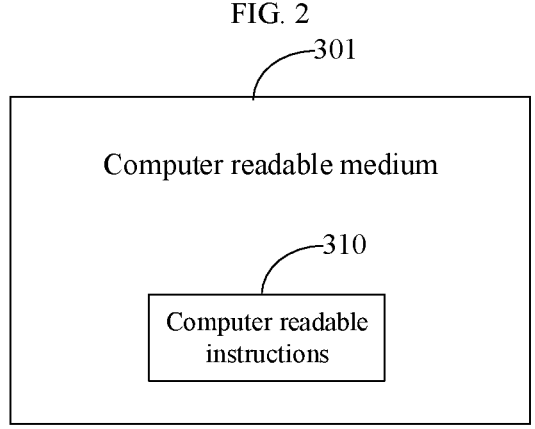
FIG. 3 is schematic diagram illustrating a computer-readable storage medium according to the present disclosure.

In view of the above object, in another aspect of the present disclosure, as shown in FIG. 3, an embodiment of the present disclosure further provides a nonvolatile computer-readable storage medium 301 storing computer-readable instructions 310 that, when executed by a processor, perform the steps of any one of the above methods for deploying a deep learning system.

It should be pointed out that the above apparatus embodiment uses the embodiment of the method of deploying a deep learning system to specifically illustrate the working process of each module. Those skilled in the art can easily conceive of applying these modules to other embodiments of the method of deploying the learning system. Of course, since the various steps in the embodiment of the method of deploying a deep learning system can may be intervened with or replaced by each other, added to one another, or deleted therefrom, and thus the apparatus for deploying a deep learning system, with such changes and combinations, shall also fall within the scope of protection of the present disclosure, and the scope of protection of the present disclosure shall not be limited to embodiments described above.

The above are exemplary embodiments of the present disclosure, but it should be noted that various changes and modifications can be made without departing from the scope of the embodiments of the present disclosure defined in the claims. The functions, steps and/or actions of the method claims in accordance with the disclosed embodiments described herein need not be performed in any particular order. In addition, although the elements disclosed in the embodiments of the present disclosure may be described or claimed in an individual form, they may also be understood as multiple unless explicitly limited to be a singular number.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A method for deploying a deep learning system, comprising:
creating an artificial intelligence plug-in comprising a deploy module, defining a node group template for a first node group and a second node group, wherein the node group template comprises indications of components installed by the first node group and components installed by the second node group, and the deploy module is stored with a shell script comprising a network time protocol installation script and a network file system installation script;
defining a cluster template for a device group based on the node group template, wherein the cluster template comprises indications of a number of first nodes in the device group for which the components are installed as per the first node group and a number of second nodes in the device group for which the components are installed as per the second node group;
validating whether the cluster template is rationally configured, and creating, based on the cluster template, a plurality of virtual machines, that correspond to a plurality of first nodes and a plurality of second nodes and each has an artificial intelligence framework, in response to the cluster template being rationally configured; and
deploying, by the deploy module, a same clock and passwordless communication to the plurality of virtual machines, selectively executing, based on the cluster template, the network time protocol installation script and the network file system installation script on the plurality of virtual machines, and importing, by the artificial intelligence plug-in and based on the communication benchmark, a deep learning mirror image into the artificial intelligence framework of each of the virtual machines designated in the cluster template using the shell script through a socket command.

2. The method according to claim 1, further comprising: creating an artificial intelligence plug-in comprising a common module before defining the node group template for the first node group and the second node group, wherein the common module is used for defining all components called by a deep learning system;
wherein the defining the node group template for the first node group and the second node group comprises: acquiring all the components from the common module, and defining the node group template for the first node group and the second node group within a range defined by all the components.

3. The method according to claim 1, further comprising: creating an artificial intelligence plug-in comprising a validation module before defining the node group template for the first node group and the second node group; wherein
a plurality of components to be installed by the first node group and the second node group respectively comprise control components and high-availability components;
the validating whether the cluster template is rationally configured comprises: using the validation module to check whether the number of the control components to be installed respectively by the plurality of first nodes and the plurality of the second nodes in the cluster template is an odd number, and/or whether the high-availability components to be installed are all provided with a downtime state detection function.

4. The method according to claim 3, wherein the creating, based on the cluster template, a plurality of virtual machines, that correspond to a plurality of first nodes and a plurality of second nodes and have an artificial intelligence framework respectively, in response to the cluster template being rationally configured comprises:
determining that the cluster template is rationally configured in response to the number of the control components to be installed respectively for the plurality of first nodes and the plurality of second nodes in the cluster template being an odd number, and/or the high-availability components to be installed being all provided with the downtime state detection function; and
in response to the cluster template being rationally configured, creating, based on the cluster template, the plurality of virtual machines by the validation module using an arrangement technique, and deploying mirror images of an artificial intelligence installation package to the plurality of virtual machines respectively.

5. The method according to claim 1, wherein a graphics processing unit driver installation script is further stored in the deploy module;
wherein the configuring the communication benchmark for the plurality of virtual machines further comprises: executing the graphics processing unit driver installation script for a virtual machine additionally in response to detecting that the first node or the second node, to which the virtual machine corresponds, is provided with a graphics processing unit directly connected to the first node or the second node.

6. The method according to claim 1, wherein the configuring the communication benchmark for the plurality of virtual machines further comprises: installing additional high-availability components to a virtual machine in response to detecting that a number of components to be installed by the first node or the second node, to which the virtual machine corresponds, is greater than a threshold.

7. The method according to claim 1, further comprising: creating an artificial intelligence plug-in comprising a client module before defining the node group template for the first node group and the second node group; and after configuring the communication benchmark for the plurality of the virtual machines, checking, by the client module, whether a successful configuration is made.

8. The method according to claim 7, wherein the client module is used for checking whether the network time protocol installation script and the network file system installation script are successfully executed, in response to the network time protocol installation script and the network file system installation script being not successfully executed, prompting a reason and terminating the deployment.

9. The method according to claim 1, further comprising preparing an AIStation mirror image before defining the node group template for the first node group and the second node group.

10. The method according to claim 1, further comprising performing post-installation activation and checking after importing the deep learning mirror image.

11. An apparatus for deploying a deep learning system, comprising:
a processor;
a controller storing a program code executable by the processor, wherein the program code, when executed by the processor, causes the processor to execute steps of:
creating an artificial intelligence plug-in comprising a deploy module, defining a node group template for a first node group and a second node group, wherein the node group template comprises indications of components installed by the first node group and components installed by the second node group, and the deploy module is stored with a shell script comprising a network time protocol installation script and a network file system installation script;
defining a cluster template for a device group based on the node group template, wherein the cluster template comprises indications of a number of first nodes in the device group for which the components are installed as per the first node group and a number of second nodes in the device group for which the components are installed as per the second node group;
validating whether the cluster template is rationally configured, and creating, based on the cluster template, a plurality of virtual machines, that correspond to a plurality of first nodes and a plurality of second nodes and each has an artificial intelligence framework, in response to the cluster template being rationally configured; and
deploying, by the deploy module, a same clock and passwordless communication to the plurality of virtual machines, selectively executing, based on the cluster template, the network time protocol installation script and the network file system installation script on the plurality of virtual machines, and importing, by the artificial intelligence plug-in and based on the communication benchmark, a deep learning mirror image into the artificial intelligence framework of each of the virtual machines designated in the cluster template using the shell script through a socket command.

12. The apparatus according to claim 11, the processor is further configured to execute steps of: creating an artificial intelligence plug-in comprising a common module before defining the node group template for the first node group and the second node group, wherein the common module is used for defining all components called by a deep learning system;
wherein the defining the node group template for the first node group and the second node group comprises: acquiring all the components from the common module, and defining the node group template for the first node group and the second node group within a range defined by all the components.

13. The apparatus according to claim 11, wherein the processor is further configured to execute steps of: creating an artificial intelligence plug-in comprising a validation module before defining the node group template for the first node group and the second node group; wherein
a plurality of components to be installed by the first node group and the second node group respectively comprise control components and high-availability components;
the validating whether the cluster template is rationally configured comprises: using the validation module to check whether the number of the control components to be installed respectively by the plurality of first nodes and the plurality of the second nodes in the cluster template is an odd number, and/or whether the high-availability components to be installed are all provided with a downtime state detection function.

14. The apparatus according to claim 13, wherein the creating, based on the cluster template, a plurality of virtual machines, that correspond to a plurality of first nodes and a plurality of second nodes and have an artificial intelligence framework respectively, in response to the cluster template being rationally configured comprises:
determining that the cluster template is rationally configured in response to the number of the control components to be installed respectively for the plurality of first nodes and the plurality of second nodes in the cluster template being an odd number, and/or the high-availability components to be installed being all provided with the downtime state detection function; and
in response to the cluster template being rationally configured, creating, based on the cluster template, the plurality of virtual machines by the validation module using an arrangement technique, and deploying mirror images of an artificial intelligence installation package to the plurality of virtual machines respectively.

15. The apparatus according to claim 11, wherein a graphics processing unit driver installation script is further stored in the deploy module;
wherein the configuring the communication benchmark for the plurality of virtual machines further comprises: executing the graphics processing unit driver installation script for a virtual machine additionally in response to detecting that the first node or the second node, to which the virtual machine corresponds, is provided with a graphics processing unit directly connected to the first node or the second node.

16. The apparatus according to claim 11, wherein the configuring the communication benchmark for the plurality of virtual machines further comprises: installing additional high-availability components to a virtual machine in response to detecting that a number of components to be installed by the first node or the second node, to which the virtual machine corresponds, is greater than a threshold.

17. The apparatus according to claim 11, wherein the processor is further configured to execute steps of: creating an artificial intelligence plug-in comprising a client module before defining the node group template for the first node group and the second node group; and after configuring the communication benchmark for the plurality of the virtual machines, checking, by the client module, whether a successful configuration is made.

18. The apparatus according to claim 17, wherein the client module is used for checking whether the network time protocol installation script and the network file system installation script are successfully executed, in response to the network time protocol installation script and the network file system installation script being not successfully executed, prompting a reason and terminating the deployment.

19. The apparatus according to claim 11, wherein the processor is further configured to execute steps of: preparing an AIStation mirror image before defining the node group template for the first node group and the second node group.

20. A non-volatile computer-readable storage medium having computer-readable instructions stored thereon, wherein the computer-readable instructions, when executed by a processor, cause the processor to perform operations of:

creating an artificial intelligence plug-in comprising a deploy module, defining a node group template for a first node group and a second node group, wherein the node group template comprises indications of components installed by the first node group and components installed by the second node group, and the deploy module is stored with a shell script comprising a network time protocol installation script and a network file system installation script;

defining a cluster template for a device group based on the node group template, wherein the cluster template comprises indications of a number of first nodes in the device group for which the components are installed as per the first node group and a number of second nodes in the device group for which the components are installed as per the second node group;

validating whether the cluster template is rationally configured, and creating, based on the cluster template, a plurality of virtual machines, that correspond to a plurality of first nodes and a plurality of second nodes and each has an artificial intelligence framework, in response to the cluster template being rationally configured; and deploying, by the deploy module, a same clock and passwordless communication to the plurality of virtual machines, selectively executing, based on the cluster template, the network time protocol installation script and the network file system installation script on the plurality of virtual machines, and importing, by the artificial intelligence plug-in and based on the communication benchmark, a deep learning mirror image into the artificial intelligence framework of each of the virtual machines designated in the cluster template using the shell script through a socket command.

* * * * *